United States Patent
Idreos et al.

(10) Patent No.: US 11,563,803 B1
(45) Date of Patent: Jan. 24, 2023

(54) OPTIMIZED SELF-DESIGNING KEY-VALUE STORAGE ENGINE

(71) Applicants: Stratos Idreos, Cambridge, MA (US); Subarna Chatterjee, Cambridge, MA (US); Meena Jagadeesan, Cambridge, MA (US); Wilson Qin, Cambridge, MA (US)

(72) Inventors: Stratos Idreos, Cambridge, MA (US); Subarna Chatterjee, Cambridge, MA (US); Meena Jagadeesan, Cambridge, MA (US); Wilson Qin, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 0 days.

(21) Appl. No.: 17/523,112

(22) Filed: Nov. 10, 2021

(51) Int. Cl.
*H04L 67/1008* (2022.01)
*H04L 67/101* (2022.01)
(Continued)

(52) U.S. Cl.
CPC ...... *H04L 67/1008* (2013.01); *G06F 9/45558* (2013.01); *G06F 16/2246* (2019.01);
(Continued)

(58) Field of Classification Search
CPC ............... H04L 67/101; H04L 67/1008; H04L 67/1097; G06F 9/45558; G06F 2009/4557; G06F 2009/45583; G06F 2009/45595

See application file for complete search history.

(56) References Cited

U.S. PATENT DOCUMENTS 9,684,866 B1 * 6/2017 Todd, Jr. .................. G06N 5/02
11,036,762 B1 * 6/2021 Bruck .................... G06F 16/278
(Continued)

FOREIGN PATENT DOCUMENTS

CN 113297432 A * 8/2021
CN 113377292 A * 9/2021

OTHER PUBLICATIONS

Z. Shen, Y. Shi, Z. Shao and Y. Guan, "An Efficient LSM-Tree-Based SQLite-Like Database Engine for Mobile Devices," in IEEE Transactions on Computer-Aided Design of Integrated Circuits and Systems, vol. 38, No. 9, pp. 1635-1647, Sep. 2019, doi: 10.1109/TCAD.2018.2855179. (Year: 2019).*

*Primary Examiner* — Kostas J Katsikis
(74) *Attorney, Agent, or Firm* — Morgan, Lewis & Bockius, LLP

(57) ABSTRACT

Embodiments of the invention utilize an optimized key-value storage engine to strike the optimal balance between cloud-cost and performance and supports queries, including updates, lookups, range queries, inserts, and read-modify-writes. Cloud cost is manifested in purchasing both storage and processing resources. The improved approach has the ability to self-design and instantiate holistic configurations given a workload, a cloud budget, and optionally performance goals and a set of Service Level Agreement (SLA) specifications. A configuration reflects an optimized storage engine design in terms of, for example, the individual data structures design (in-memory and on-disk) in the engine as well as their algorithms and interactions, a cloud provider, and the exact virtual machines to be used.

25 Claims, 8 Drawing Sheets

(51) Int. Cl.
  *H04L 67/1097* (2022.01)
  *G06F 9/455* (2018.01)
  *G06F 16/22* (2019.01)

(52) U.S. Cl.
  CPC ........ *G06F 16/2255* (2019.01); *H04L 67/101* (2013.01); *H04L 67/1097* (2013.01); *G06F 2009/4557* (2013.01); *G06F 2009/45583* (2013.01); *G06F 2009/45595* (2013.01)

(56) References Cited

U.S. PATENT DOCUMENTS

| | | | |
|---|---|---|---|
| 11,093,472 B2* | 8/2021 | Spillane | G06F 16/2219 |
| 2016/0019074 A1* | 1/2016 | Nahir | G06F 9/5077 718/1 |
| 2017/0123727 A1* | 5/2017 | Kim | G06F 3/0673 |
| 2017/0249349 A1* | 8/2017 | Bhat | G06F 16/1748 |
| 2020/0057782 A1* | 2/2020 | Idreos | G06F 16/2246 |
| 2020/0250148 A1* | 8/2020 | Dayan | G06F 7/14 |
| 2020/0341889 A1* | 10/2020 | Idreos | G06F 16/2272 |
| 2021/0160137 A1* | 5/2021 | Unnikrishnan | H04L 67/1036 |

\* cited by examiner

Algorithm 1 Algorithm for learning $\phi$

Input: $S$, Output: $\phi_{q,r}^{s_i}$ // value of $\phi$ for op $q$ on class $r$ for $s_i$ 1: $R$ : {LSM, BTree, LSH, Hybrid}
2: $Q$ : {lookup, insert, blind update, rmw, range}
3: for each provider $s_i \in S$ do
4:     for each design class $r \in R$ do
5:         for each op type $q \in Q$ do
6:             $\Phi_{q,r}^{s_i}$ = NULL
7:             for each VM $v$ of distinct type do
8:                 for data $D \in [1M..100M]$ do
9:                     populate system with $D$ on layout $r$
10:                   for op count $oc \in [1M..10M]$ do
11:                       for $c \in [1..v^{CPU}]$ do
12:                           set $c$ as query parallelism
13:                           $T(c)$ = run $oc$ ops of type $q$ on $c$ cores
14:                           $\hat{g} = \frac{T(c)}{T(1)}$
15:                           get $\phi_{q,r,v,D,c}$ using Eq (2)
16:                           $\Phi_{q,r} = \Phi_{q,r} \cup \{\phi_{q,r,v,D,c}\}$
17:             $\phi_{q,r}^{s_i}$ = average of values in $\Phi_{q,r}$
18: function getPhiForWorkload($W, r, s_i$)
        $\phi_{W,r}^{s_i} = \sum_{o=1}^{\text{all op types in } W} \phi_{o,r}^{s_i} \times$ proportion of $o$ in $W$

Figure 1B

Algorithm 2 The Cost-Performance Optimization

Input: $D, W, S$ Output: Cost-performance continuum ($F$)
1: $\text{budget}^{min} = \infty, \text{budget}^{max} = 0$
2: for all $s_i \in S$ do
3:     Generate $H_{s_i}$
4:     $\text{cost}_{storage} = \text{getStorageCost}(s_i, D)$
5:     for all configurations $\Lambda \in H_{s_i}$ do
6:         $M_\Lambda = \sum_{j=1}^{k_i} v_{i,j}^{mem}, \forall v_{i,j} \in \Lambda$
7:         $\text{cost}_{compute} = \sum_{j=1}^{k_i} \lambda_{i,j} \times \text{monthly\_price}(v_{i,j})$
8:         $\text{cost}_{SLA} = \text{getSLACost}(D, s_i, \Lambda)$ /*shown in [2]*/
9:         $\text{cost}_{\Lambda, i} = \text{cost}_{compute} + \text{cost}_{storage} + \text{cost}_{SLA}$
10:        $\text{budget}^{min} = \min(\text{budget}^{min}, \text{cost}_{\Lambda, i})$
11:        $\text{budget}^{max} = \max(\text{budget}^{max}, \text{cost}_{\Lambda, i})$
12:        Shard $W$ into $(W_1, W_2, \cdots, W_{|k_i|})$ s.t. #ops in $W_j \propto \frac{\lambda_{i,j} \cdot v_{i,j}^{mem}}{M_\Lambda}$
13:        Add 10% noise to $W$ using noise model [2]

Figure 1C

Algorithm 2 The Cost-Performance Optimization    (Continued)

```
14:         for all VM types v_{i,j} in Λ and λ_{i,j} > 0 do
15:             M_B = ε.M, latency^min_{v_{i,j}} = ∞
16:             while T ∈ [2..B_l] do
17:                 while K ∈ [1..T − 1] do
18:                     while Z ∈ [1..T − 1] do
19:                         while M_B ≤ M do
20:                             Set Ω : (T, K, Z, M_B, M_{BF}, M_{FP}, v^{CPU}_{i,j})
21:                             Get no. of levels L using [74]
22:                             Find min(Y) s.t. Σ_{l=1}^{L-Y}(M^l_{BF} + M^l_{FP}) ≤ (M − M_B)
23:                             IO_{v_{i,j}} = get IOs using Equation (1)
24:                             Find design class D of Ω and get φ of W on D
25:                             Compute speedup g_{v_{i,j}} with Equation (2)
26:                             latency_{v_{i,j}} = IO_{v_{i,j}}/IOPS_{s_j} · 1/g_{v_{i,j}}
27:                             if latency_{v_{i,j}} < latency^min_{v_{i,j}} then
28:                                 latency^min_{v_{i,j}} = latency_{v_{i,j}}
29:                                 update optimal design for v_{i,j} with Ω
30:                             Increment M_B by ε.M
```

Figure 1D

Algorithm 2 The Cost-Performance Optimization    (Continued)

31:        build tuple $F_{\Lambda,i,j}$: $(\Omega, v_{i,j}, W_j, \text{latency}_{v_{i,j}}^{\min})$
32:        $F_{\Lambda,i} = F_{\Lambda,i} \cup F_{\Lambda,i,j}$
33:        $\text{latency}_{\Lambda,i} = \max(\text{latency}_{v_{i,j}}) \, \forall v_{i,j} \in \Lambda$
34:    $F_{s_i} = F_{s_i} \cup (F_{\Lambda,i}, \text{latency}_{\Lambda,i}, \text{cost}_{\Lambda,i})$
35:  $F = F \cup F_{s_i}$
36:  for $c \in [\text{budget}^{\min}..\text{budget}^{\max}]$ and all $s_i \in S$ do
37:    Find $F_{\Lambda,i}$ s.t. $\operatorname{argmin}_{\text{cost}_{\Lambda,i} \leq c}(\text{latency}_{\Lambda,i})$

Figure 1E

Algorithm 3 Mapping layout to algo abstractions

Input: $\Omega, W, s_l$
    Output: initialized algorithmic primitives
1: if $\Omega \to M_{BF}! = 0$ then
2:     if $\Omega \to Y > 0$ then
3:         class = "Hybrid"
4:     else
5:         class = "LSM"
6: else if $\Omega \to T > B$ then
7:     class = "LSH"
8: else
9:     class = "BTree"
10: $\phi$ = getPhiForWorkload($W$, class, $s_l$)
11: set algorithmic primitives based on class and $\phi$ using Table 1

Figure 1F

OPTIMIZED SELF-DESIGNING KEY-VALUE STORAGE ENGINE

GOVERNMENT FUNDING

The present invention was supported in part by grant no. DE-SC-0020200 from the Department of Energy. The U.S. Government has certain rights in the invention.

FIELD OF THE INVENTION

The field of the invention relates, generally, to key-value stores and, more particularly to an optimized self-designing key-value storage engine.

BACKGROUND

Key-value stores serve as the backbone of data storage for a wide range of applications, such as graph processing in social media, event log processing, web applications, and online transaction processing. Relational systems also increasingly use key-value stores internally for core functionality, such as the catalog or even base data storage and indexing. Machine learning pipelines deploy key-value stores for data exploration, storing features, and maintaining debugging data e.g., for neural networks. Bitcoin uses a key-value engine in its primary infrastructure for network nodes.

With the growing diversity of applications and data sizes, key-value stores are increasingly deployed on the cloud. Cloud providers offer auto-scaling of resources (e.g., bandwidth, computation, memory and storage) and budget requirements based on the demands of the workload. This liberates applications from directly managing workload scaling as resource requirements evolve. For instance, AMAZON WEB SERVICES (AWS) cloud, the GOOGLE CLOUD PLATFORM (GCP), and MICROSOFT AZURE provide support for automatic configuration and deployment of some of the widely used key-value stores, such as MongoDB, CouchDB, RocksDB, and Cassandra.

Current key-value systems are challenged by growing application diversity and data sizes, which in turn result in growing cloud budgets. The source of the problem is in the inherent complexity of data system design and the numerous metrics and factors that affect performance and cloud cost. As a result, organizations, systems administrators, and even expert data system designers cannot predict how a special combination of a key-value store design, a cloud provider (their pricing policies and hardware), and a specific workload (data and queries) will ultimately behave in terms of end-to-end performance and cloud-cost requirements. This can lead to severe performance bottlenecks or cost requirements that are difficult to overcome given the time, effort, and risk involved in switching to a different system or investing in building a new one.

For example, state-of-the-art key-value stores are typically designed to meet and tailored to the requirements of specific, limited workload types for which they provide excellent (even optimal) performance. Applications select from the limited set of choices of underlying storage engine designs of existing systems, typically engines that are based on B-trees for read-heavy workloads, Log-Structured-Merge (LSM)-trees for write-heavy workloads, or Log-Structured-Hash (LSH) tables for systems with large memory. Utilizing such engines for any other workload type does not guarantee optimality. Moreover, making a bad choice and then having to switch from one storage engine to another can result in substantial costs; applications need to make hard choices between either being stuck with a sub-optimal system or transition. Even with a single cloud provider, it is imperative to choose the correct configuration of hardware resources to maximize performance and simultaneously safeguard an application from paying extraneous costs.

Currently, these decisions are manually made based on past experience. However, given the complexity of all options involved (even with a given system design) organizations are often led to wrong choices with significant negative impact. Accordingly, there is a need for approaches that match the current and projected resource requirements for a workload with offerings tailored to current needs and that are sufficiently scalable to accommodate future changes.

SUMMARY

In accordance with embodiments of the present invention, the design of the key-value storage engine itself is optimized around a workload and available resource offerings. Key-value storage engines in accordance herewith may have the ability to self-design and instantiate holistic configurations given a workload, a cloud budget, and optionally performance goals and a set of Service Level Agreement (SLA) specifications. A "configuration" is composed of the storage engine design in terms of the individual data structures (in-memory and on-disk) in the engine as well as their algorithms and interactions, a cloud provider, and virtual machines to be used. Unlike conventional systems that are locked into a small fraction of the possible design space, a system realized according to the techniques described herein can mix and match storage engine design elements at a foundational level. In some embodiments, this creates a large space (e.g., sextillions) of storage engine configurations, most of which do not currently exist. The system automatically takes an optimal or near-optimal configuration shape for the problem at hand, making it possible to scale across data size, application (workload) diversity, and cloud budget.

Accordingly, in one aspect, the invention pertains to a storage system that includes a main memory comprising volatile storage and including a file buffer. The storage system also includes a secondary store comprising nonvolatile storage for storing files. The storage system also includes a key-value storage engine including indexes to files stored in the file buffer and the secondary store, the key-value storage engine being organized into levels and indexing the files as key-value pairs. The storage system also includes a processor for performing a workload including memory-access runs, each run specifying one or more files to be written from the file buffer to the secondary store and one or more files to be retrieved from the secondary store to the file buffer. The key-value storage engine has a configuration including at least one data structure design and computational hardware. The configuration is optimized based at least in part on a cost model that comprises (i) an analytical distribution-aware input-output (I/O) model of data movement across a design space of possible key-value memory configurations and (ii) a learned concurrency model that accounts for processor resources, query concurrency, and hardware parallelism, and estimates a cost of executing an input workload for a cloud-based memory resource budget and a target latency and throughput.

In some embodiments, the configuration is optimized by the processor. The data structure designs may comprise or consist of designs for read-heavy workloads, write-heavy workloads, designs for systems with large memory, and combinations thereof. In some embodiments, the data structure designs comprise one or more of log-structured merge-trees, B-trees, log-structured hash tables, or combinations thereof. The computational hardware may, for example, comprise nonvolatile storage and at least one virtual machine. In some embodiments, the data structure designs comprise at least one in-memory accelerator. The in-memory accelerator(s) comprises accelerators for buffer, filters, and indexes. In some embodiments, the cost model includes cloud pricing policies for a plurality of cloud providers.

In some embodiments, the processor is further configured to use a code template that allows structured descriptions of data layout and algorithmic abstractions of the storage engine. The code template may include layout primitives for design and hardware specifications for key-value storage engines based on core data structures thereof. In various embodiments, the processor is further configured to choose among construction policies of filters based on the layout primitives.

The layout primitives may include one or more of (i) the size of keys in a workload, (ii) the size of values in the workload, (iii) the maximum number of entries in a memory block; (iv) the number of runs per hot level at which hot levels of the key-value storage engine are compacted; (v) the number of runs per cold level at which cold levels of the key-value storage engine are compacted; (vi) a logical block size corresponding to a number of consecutive disk blocks; (vii) buffer capacity corresponding to an amount of memory allocated to in-memory buffer or memory tables; (viii) the amount of memory allocated to memory indexes; or (ix) bits per entry assigned to one or more Bloom filters.

In some embodiments, the code template includes criteria for parallelism and data access including one or more of (i) a granularity of Bloom filters of the key-value storage engine; (ii) a compaction or restructuring algorithm; (iii) a run strategy for partial or hybrid compaction; (iv) a merge threshold at which a compaction is triggered; (v) a value denoting how many memory levels will have full compaction; (vi) the number of CPUs or available cores for use in a virtual machine; and/or (vii) the maximum number of threads used to process a workload.

In some embodiments, the processor is further configured to characterize a workload as a set of operations over a universe of key-value pairs, using (i) a distribution of keys and operations in the workload, and (ii) a proportion of each operation type in the workload. The processor may be further configured to use a plurality of distributions over which keys are drawn for reads and writes. In some embodiments, the plurality of distributions comprises (i) a uniform distribution in which any key is equally likely to be drawn, or (ii) a non-uniform distribution. The learned concurrency model may learn a proportion of a program that is parallelizable by benchmarking each operation type in the input workload based on shared core design elements. Benchmarking may, for example, include measuring a speedup obtained by increasing a number of queries executed in parallel. In some embodiments, the key-value storage engine includes a plurality of types of virtual memory and the benchmarking is performed for each type of virtual memory and for each cloud-based memory resource.

In some embodiments, the processor is further configured to: transform tradeoff among storage engine designs, hardware and cloud cost, into a cost-performance Pareto frontier which is a continuum (i) with an optimal configuration at every point and (ii) where higher cloud cost maps to better or at least the same performance. In some embodiments, the processor is further configured to construct the continuum one cloud provider and one cloud cost at a time; and repeat the construction of the continuum for each distinct VM type within each configuration of each cloud provider, thereby ranking all possible configurations across all cloud providers.

In some embodiments, the configuration is optimized based further on cloud SLA requirements, which may include at least one of database migration, operational and tooling support, back-up, reliability, or availability. In various embodiments, the configuration is optimized based further on quantifying each SLA requirement and for any SLA required for the input workload, co-optimizing cloud cost for purchase of hardware and SLAs, thereby ensuring that the combined price of hardware and SLAs does not exceed a predetermined cloud budget. At least part of the key-value engine may be deployed on a cloud-based memory resource.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which:

FIGS. 1B-1F show algorithms used in some embodiments;

DETAILED DESCRIPTION

Figure 1A:
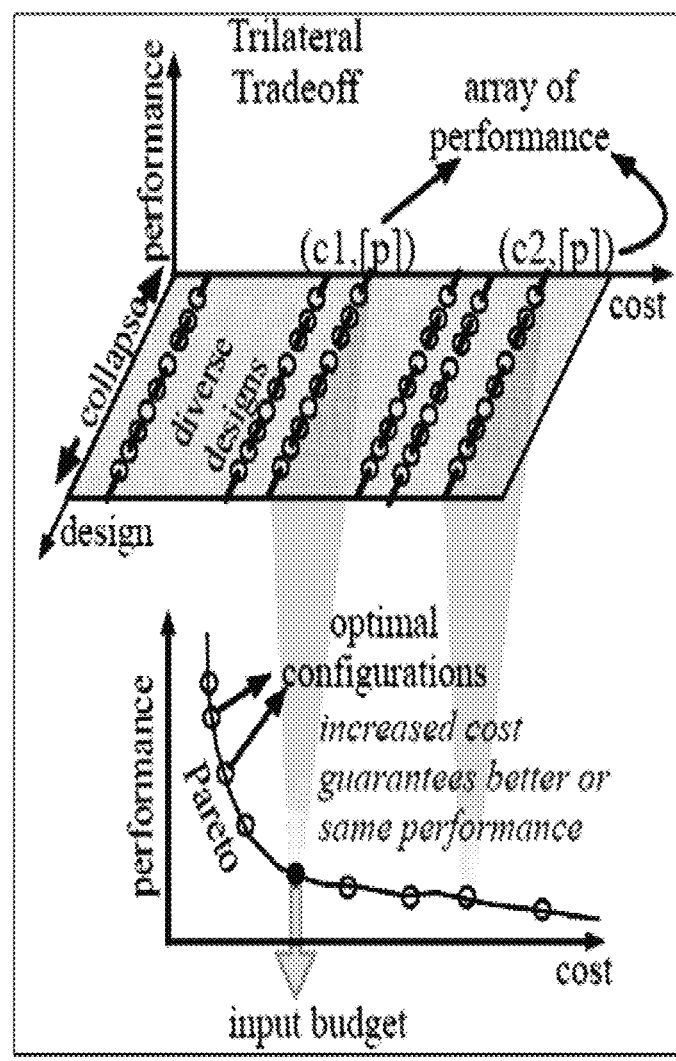
FIG. 1A schematically depicts generation of a continuum, in accordance with various embodiments of the current invention.

Embodiments of the present invention focus on key-value store systems and use fine-grained first principles that form a massive design space out of which pick the best or optimal instance for a given workload may be identified. Some embodiments utilize an exhaustive search space of key-value storage engine designs comprising combinations of (a) data structure designs (including LSM-trees, B-trees, LSH-tables, and trillions of valid new designs which are hybrids of those) and in-memory accelerators, such as accelerators for buffer, filters and indexes, (b) hardware for storage, such as HDD, SSD, or EBS, and computation (VMs), and (c)

cloud providers (e.g., AWS, GCP, AZURE) for an input workload. In various embodiments, a unified model estimates the expected cost of executing a given workload with a given engine design. The model may include an analytical distribution-aware I/O model that captures data movement across the exhaustive design space of possible key-value storage engines, and a learned concurrency model that captures CPU, query concurrency, and hardware parallelism through a training phase that is kept at minimum cost by selectively training for a few of the possible designs. In some embodiments, the system collapses, for a given workload, the massive possible design space into a Pareto frontier of ranked configurations that co-optimizes available cloud budget, required cloud SLAs, and required performance. This enables identifying the best configuration for the current application. Systems in accordance herewith may include noise in the input workload so that the resulting engines are robust to workload drifts. Some embodiments use a storage engine code template that allows structured descriptions of the system's data layout and algorithmic abstractions. In some embodiments, the output of a search is a Rust implementation of the target storage engine design.

Towards the end goal of self-designing and materializing the close to optimal storage engine for different applications, cloud providers, and cloud budgets, the system may implement a storage engine template—a dictionary of design abstractions to allow structured descriptions of arbitrary key-value storage engine designs. The storage engine template spans many (e.g., millions) of possible designs that are derived by combining elements from three designs which span the extremes of performance from read to write optimized: B-trees, LSM-trees, and LSH-tables. Storage engines based on those designs store data on disk in ever growing hierarchies or logs while providing in-memory structures to quickly navigate and skip data to minimize disk access.

System Organization and Operation

Tables 1A and 1B show components of the template, according to some embodiments.

TABLE 1A

Key size: Denotes the size of keys in the workload.
Value size: Denotes the size of values in the workload.
All values are accepted as variable-length strings.
Size ratio (T): The maximum number of entries in a block
(e.g. growth factor in LSM trees or fanout of B-trees.
Runs per hot level (K): At what capacity hot levels are compacted.
Rule: should be less than size ratio.
Runs per cold level (Z): At what capacity cold levels are compacted.
Rule: should be less than size ratio.
Logical block size (B): Number of consecutive disk blocks.
Buffer capacity ($M_B$): Denotes the amount of memory allocated
to in-memory buffer/memtables. Configurable w.r.t file size.
Index($M_{FP}$): Amount of memory allocated to indexes
(fence pointers/hashtables).
Bloom filter memory ($M_{BF}$):
Denotes the bits/entry assigned to Bloom filters.
Bloom filter design: Denotes the granularity of Bloom filters,
e.g., one Bloom filter instance per block
or per file or per run. The default is file.
Compaction/Restructuring algorithm: Full does
level-to-level compaction; partial, is file-to-file;
and hybrid uses both full and partial at separate levels.
Run strategy: Denotes which run to be picked for compaction
(only for partial/hybrid compaction).

TABLE 1B

Bloom filter design: Denotes the granularity of Bloom filters,
e.g., one Bloom filter instance per block or per file or per run.

TABLE 1B-continued

The default is file.
Compaction/Restructuring algorithm: Full does
level-to-level compaction; partial is file-to-file:
and hybrid uses both full and partial at separate levels.
Run strategy: Denotes which run to be picked for compaction
(only for partial/hybrid compaction).
File picking strategy: Denotes which file to be picked
for compaction (for partial/hybrid compaction). For LSM-trees
we set default to dense_fp as it empirically works
the best. B-trees pick the first file found to be full.
LSH-table restructures at the granularity of runs.
Merge threshold: If a level is more than x % full,
a compaction is triggered.
Full compaction levels: Denotes how many
levels will have full compaction (only
for hybrid compaction). The default is set to 2.
No. of CPUs: Number of available cores to use in a VM.
No of threads: Denotes how many threads
are used to process the workload.

Table 1A shows layout primitives that help describe key-value storage engines based on the design of their core data structures, in-memory and on-disk. For example, $M_B$, $M_{BF}$, $M_{FP}$ define the memory allocated to the buffer Bloom filters and fence pointers. As is well known, a Bloom filter is a space-efficient probabilistic data structure used to test whether an element is a member of a set. False positive matches are possible but false negatives are not—in other words, a query returns either "possibly in set" or "definitely not in set." Fence pointers contain the first key of every disk page of a run; this allows lookups to access a particular key within a run with just one I/O.

The template provides flexibility, e.g., it is possible to choose between the construction policies of the filters—reducing the false positive rate (FPR), optimizing the number of internal hash functions, or controlling the granularity of filters per block, file, or run. Based on the memory footprint of filters and fence pointers, the system divides L disk-levels of a storage engine into L—Y hot and cold levels. Data residing at hot levels are quickly accessed with in-memory filters and fence pointers whereas cold levels have to be accessed through cascading fence pointers on-disk. Other layout primitives include the size ratio (T) denoting the factor by which disk-levels grow in capacity, and merge thresholds (K and Z) denoting how greedily merges happen within a level (hot and cold). These few primitives are sufficient because, as described below, there is generally another set of rules that help derive additional layout design elements of an engine. For example, the number of bits to give to each Bloom filter of each level can be derived based on $M_{BF}$.

These primitives allow the system to take the shape of arbitrary and diverse designs in terms of storage engine data layouts including LSM-Trees, B-Trees, LSH-Tables and several hybrids in between. For example, according to Table 1A and 1B, the layout of LSM-tree based RocksDB is described as T=10, K=1, Z=1, $M_{BF}$=10 and B-Tree based WiredTiger as T=32, K=1, Z=1, $M_{BF}$=0. For both engines, the memory footprint of indexes, $M_{FP}$, decides the number of hot and cold levels of the tree. On the other hand, a storage engine such as FASTER, which is a flat data structure, corresponds to setting $$T = \frac{N \cdot E}{M_B}$$

enforcing the first level to never run out of capacity. This also implies that the merge thresholds are set to maximum such that the level is never compacted, i.e. K=T−1, Z=T−1. As FASTER uses in-memory hash tables, $M_{FP}$ takes that into account. By default, FASTER creates hash-bucket entries amounting to $$\frac{1}{8}^{th}$$

of the keys, hence $$M_{FP} = \frac{N \cdot F}{8} * \left(1 + \frac{1}{B}\right).$$

Based on Tables 1A and 1B, templates for diverse data structures, such as LSM variants, B-tree variants, LSH variants, and new designs (e.g., designs with a log-structured layout at the hot levels and a B-tree at the cold levels) can be constructed.

On top of the basic data lay-outs, for the system to achieve its end goal, the system needs to be able to consider additional critical storage engine design components, such as the ones shown above in Table 1B for hardware parallelism and maintenance strategies. In addition, the system includes a series of innovations beyond engine specifications, such as being able to judge different designs (without implementing them first), consider the effect of query and hardware parallelism on each design, search over the massive possible space efficiently for the best (yet robust) design given a cloud budget, workload, and SLAs, and finally materialize the code of the resulting storage engine so that it is ready for deployment. Each of these implementations and techniques are described below in detail.

Distribution-Aware I/O Modeling

Given a workload, the system needs to evaluate the massive number of possible storage engine designs in a practical way, i.e., without actually running the workload with all possible designs, cloud providers and VMs. For this, the system calculates the expected performance on a given hardware for any candidate storage engine design. Described herein is a model for I/O and a model for CPU, and how the models are used to build a search algorithm for the best design given a workload. The model is precise. The I/O cost estimates is within a 1+r factor of the actual I/O, where r is a small error parameter, regardless of data properties, data size, query patterns, and engine design. The model is also conservative. The model generates only positive errors that is only over-estimating of I/O costs. This property lowers the chances of exceeding the desired cloud budget or breaching the performance target as a result of estimation errors. The model is also consistent. If a storage engine design outperforms another design in practice, this is reflected in the model estimates.

Table 2 shows notations used in the following description.

TABLE 2

| Symbols | Explanation | Cost | Symbols | Explanation | Cost |
|---|---|---|---|---|---|
| Workload + Performance | | | | | |
| $\theta_r$ | Fraction of total lookups | — | $\theta_w$ | fraction of rmws | $\sigma_w$ |
| $\theta_l \cdot \theta_r$ | Fraction of single-result lookups | $\sigma_l$ | $\theta_s$ | fraction of scans | $\sigma_s$ |
| $(1 - \theta_l)\theta_r$ | Fraction of no-results | $\sigma_n$ | $D_{get}$ | get key distribution | — |
| $\theta_p$ | Fraction of inserts | $\sigma_p$ | $D_{put}$ | put key distribution | — |
| $\theta_u$ | Fraction of updates | $\sigma_u$ | Q | queries in workload | — |
| Cost-Model | | | | | |
| $\sigma_n$ | $K\left(\sum_{i=1}^{L-Y-1} p_i\right) + (Y+1)Z$ | | | | |
| $\sigma_l$(uniform) | $C_0 + \sum_{i=1}^{L-Y-1} p_i\left(\sum_{r=1}^{K} C_{r,i}\right) + \sum_{i=max(1,L-Y)}^{L}\left(\sum_{r=1}^{Z} C_{r,i}\right)$ | | | | |
| $\sigma_l$(skew) | $\frac{1}{B}\left(\sum_{i=1}^{L-Y-1} \frac{E_B \cdot T^{i-1}(T/K+1)}{Q_{i-1}}\right) + \frac{1}{B}\left(\frac{E_B \cdot T^{L-Y-1}(T/Z+1)}{Q_{L-Y-1}}\right) +$ $\frac{1}{Q_{L-Y-1}} \sum_{i=L-Y+1}^{L} \min\left(E_B \cdot T^{L-Y-1} \cdot \frac{\max(1, 1+\min(B-T, T))}{\max(1, B-T)}, \frac{E_B \cdot T^i}{B}\right)$ | | | | |
| $\sigma_p$ | $\frac{1}{B}\left(\sum_{i=1}^{L-Y-1} \frac{E_B \cdot T^{i-1}(T/K+1)}{Q_{i-1}}\right) + \frac{1}{B}\left(\frac{E_B \cdot T^{L-Y-1}(T/Z+1)}{Q_{L-Y-1}}\right) +$ $\frac{1}{Q_{L-Y-1}} \sum_{i=L-Y+1}^{L} \min\left(E_B \cdot T^{L-Y-1} \cdot \frac{\max(1, 1+\min(B-T, T))}{\max(1, B-T)}, \frac{E_B \cdot T^i}{B}\right)$ | | | | |
| $\sigma_u$ | $I_{M_{BF}=0}(\sigma_l + 1/B) + I_{M_{BF}=0}\sigma_p$ | | | | |
| $\sigma_w$ | $I_{M_{BF}=0}\sigma_p + I_{M_{BF}=0}(\sigma_l + \sigma_p)$ | | | | |

TABLE 2-continued

| Symbols | Explanation | Cost | Symbols | Explanation | Cost |
|---|---|---|---|---|---|
| $\sigma_s$ | $\frac{2s}{B}\left(\sum_{i=1}^{L-Y} E_B \cdot T^i + \sum_{i=L-Y+1}^{L-1} I_{T<B} E_B \cdot T^i + E_B \cdot T^L\right) + I_{T=B}\max(0, Y-1)$ | | | | |
| | | Building Blocks of Model | | | |
| $p_i$ | Probability of a false positive at a bloom filter at a run at hot level i | | | | |
| $C_0, C_0^1, C_0^2$ | Probability of not being in buffer for uniform key, skew special key, skew regular key | | | | |
| $C_{r,i}, C_{r,i}^1, C_{r,i}^2$ | For a hot level, probabilty of not being in run r, level i or previous runs for uniform key, skew special key, skew regular key. For a cold level, probability of not neing in any node at level i or nodes in previous levels for uniform key, skew special key, skew regular key | | | | |

Systems in accordance herewith describe workloads as a set of operations over a universe of key-value pairs, using (a) the distribution of the keys and operations in the workload and (b) the proportion of each operation type: single-result lookups, no-result lookups, range queries, inserts blind updates (updating the value of an entry regardless of its current value), and read-modify-writes (rmws) (updating the value of an entry based on the current value). This forms a "workload feature vector." It is possible to feed all of the information about a workload (i.e. the exact sequence of operations and keys-value pairs) into the cost model, to have an exact estimate of I/O cost. However, the system supports any possible workload possible, so such a strategy would be intractable, since the space of workloads is enormous. Thus, some embodiments use a low-dimensional "summary" of the keys to strike a balance between tractability and precision. Suppose $\mathfrak{D}_{get}$ (and $\mathfrak{D}_{put}$) are distributions over which keys are drawn for reads (and writes). Assume that querying keys are drawn independently from these distributions.

In some embodiments, the model supports two types of distributions: uniform and skew. A uniform distribution is defined over a universe U to satisfy the property that any key is equally likely to be drawn. A skew distribution is composed of two uniform distributions stitched together with a stitching parameter p. That is, a skew distribution consists of two distinct universes $U_1$ and $U_2$ in which, $U_1$ is the universe or a set of special keys that are likely to be accessed more than the set of remaining regular keys residing within $U_2$. More precisely, a special key is drawn with probability $$\frac{p}{|U_1|}$$

and a regular Key is drawn with probability $$\frac{1-p}{|U_2|}.$$

For the uniform case, $\mathfrak{D}_{get}$ is uniform over a universe of size U and $\mathfrak{D}_{put}$ is uniform over the keys that have been inserted/updated. For the skew case, the universe is partitioned into $U_1$ and $U_2$ such that keys are drawn from $U_1$ and $U_2$ for lookups with $p_{get}$ and $1-p_{get}$ probability, respectively. The same definition applies to writes, with the respective probabilities being $p_{put}$ and $1-p_{put}$. This distribution can be viewed as a simplification of the Zipf distribution, and it creates a sharper truncation between hot and cold keys for ease of analysis.

Table 2 shows how the system estimates the cost of each type of operation supported by a key-value storage engine. This is a unified model, which means that it works across all possible storage engine designs (LSM-trees, B-Trees, LSH-Tables and anything in between) defined by the primitives of the system. For a workload of Q operations, some embodiments use per-operation I/O cost and proportion of different type of operations in the workload to compute the total I/O cost of the workload (see also definitions in Table 2):

$$IO_{total}=Q(\theta_p\sigma_p+\theta_r\theta_l\sigma_l+\theta_r(1-\theta_l)\sigma_n+\theta_u\sigma_u+\theta_w\sigma_w+\theta_s\sigma_s) \quad (1)$$

The intuitions that lead to the model construction using examples for specific storage engine designs and operations are described herein. One insight is that for all designs supported by the system, the disk part of the data layout is effectively built from arrays and pointers connected in a hierarchical format. The cost-model leverages this structure to decompose the I/O cost into inter-dependent per-level quantities and embeds the fundamental read/write behavior of each core design class (LSM-tree/B-tree/LSH-tables) within its cost computation. This allows the resulting unified model to work for any storage engine design possible within the possible space.

For an LSM-tree-like design and a single-result lookup, when a key is found in the memory buffer or at a higher disk level, the query terminates and no data from the lower levels of the tree is brought into memory. This is sometimes called early stopping. Early stopping is not of much relevance when the distribution of writes is uniform over a large universe, as the most recent copies of almost all the keys reside at the bottom level. On the other hand, when the read distribution cycles through a small number of keys, as in the case of skew distributions, those keys are very likely to live in the buffer or at a high level, and early stopping can significantly impact the single-result lookup estimate, $\sigma_1$. The distribution-aware model precisely captures the impact of early stopping on $\sigma_1$ as a function of $\mathfrak{D}_{put}$ and $\mathfrak{D}_{get}$ through the distribution-dependent quantities $C_0$ and $C_{r,i}$, which capture the probability that an access to a given run is attempted. On the other hand, the system's models for the no-result lookup cost account for the fact that early stopping does not occur for these queries.

In workloads with a high proportion of updates, merges between the buffer and the first disk-resident level occur less frequently: an update of a key residing in the in-memory buffer is handled in place. The system captures that the same effect also globally reduces the frequency of merges between all disk-resident levels. This effect is called infrequent merging. Infrequent merging is less prominent when the distribution of writes is uniform over a large universe, where almost all writes are insertions. On the other hand, when the write distribution cycles through a small number of keys, as in the case of skewed distributions, many of the writes may be updates, leading to infrequent merging. The model is able to capture the impact of infrequent merging on $\sigma_p$ as a function of $\mathcal{D}_{put}$ through the distribution-dependent quantities $Q_i$, which estimate the expected number of writes to fill a run in level i. Rmws are modeled as a composition of other operations, e.g., for LSMs, the cost of an rmw is the summation of a lookup and an insert whereas for B-trees or LSH it is same as an update.

For modeling range queries, key distribution is not needed because the effect of early stopping does not occur: range queries need to access every hot level. With a selectivity of s, for hot levels, roughly s fraction of the entries at each level will be touched using the in-memory fence pointers. For internal nodes at cold levels, the system differentiates between the case where T=B and T<B which impacts whether data at internal nodes needs to be scanned as well. For the last cold level, the system's models account for touching all relevant leaf nodes.

For a single-result lookup following skew distribution when a design only has hot levels, i.e., Y=0, the expected cost may be expressed as $\sigma_p = p_{get} \times \sigma_{ls} + \sigma_{ln} \times (1 - p_{get})$ where $\sigma_{ls}$ is the expected cost of a special key lookup and $\sigma_{ln}$ is the expected cost of a normal key lookup.

Given that the skew distributions are uniform over special keys, it suffices to consider a generic special key k and its expected cost over the randomness of $\mathcal{D}_{put}$. The I/O cost is the sum of the I/O cost of accessing the disk block containing the key and the I/Os due to Bloom filter false positives. If the key is in the buffer or the block cache, the I/O cost of accessing the data is 0, otherwise it is 1. $C_0^1$ captures this cost. For the false-positive incurred costs, by linearity of expectation, it suffices to compute the probability that a block in a given run will be touched and then add up the probabilities. The expression $p_i C_{r,i}^1$ precisely captures this cost for run r at level i, where $p_i$ is the probability of obtaining a false positive and $C_{r,i}$ is the probability that the actual key is not in the current run or any previous runs (so the access has not terminated yet). The argument is similar for $\sigma_{ln}$.

To compute $C_0$ and $C_{r,i}^1$ some embodiments determine the distributions over queried special keys as uniform over $U_1 \cap K_{special}$ (where $K_{special}$ is the set of keys in the data structure). This can be viewed as the conditional distribution of $U_1$ conditioned on the key being in K special. Therefore, the probability that a key k is not in any of the runs up to a given run is, $$\frac{P[k \in K_{special}, k \text{ is not in any runs up to a given run}]}{P[k \in K_{special}]}.$$

The system now relies on the independence of keys across different runs and conditions on the data structure being full. "Weights" are added to designate that runs are likely to be a certain fraction full "on average". The numerator can be expressed as, $$\left(\prod_{up\ to\ current\ run} P[k \text{ is not in the run}]\right) \times (1 - P[k \text{ is in a later run}]).$$

For a run r at level i≥1, the first term is $(1-\alpha^{O,i})(1-\alpha^{Bc,l}) \times (\prod_{h=1}^{i-1}(1-\alpha^{h,l})^K)(1-\alpha^{i,l})^r$. Similarly, the second term is $1-(1-\alpha^{i,l})^{K-r}(\prod_{h=i+1}^{L-Y-1}(1-\alpha^{h,l})^K)$. In these expressions, $\alpha^{i,l}$ captures the probability that k appears in a given run at level i. The calculation of $\alpha^{i,l}$ can be obtained from skew properties of $\mathcal{D}_{put}$.

Concurrency-Aware CPU Modeling

In addition to I/Os, performance of storage engines is significantly affected by CPU costs and hardware parallelism. Analytical models, similar to I/O in the previous section, that capture in-memory and hardware effects is extremely complicated and error prone, even for a single design. The challenge is that there are many factors that affect CPU performance and are tightly connected compared to the single factor of I/O when data comes from disk. Therefore, some embodiments instead use learning in a hardware-conscious way.

Amdahl's Law theoretically reasons about how much speedup can be achieve for a given number of cores. Every program has a sequential component and a parallelizable component and with more cores, it is only the run-time of the parallelizable component that improves. If a proportion ø of a program is parallelizable and it takes T time units to execute it with 1 core, then for η cores, the speedup g is as follows:

$$g = \frac{T}{T - \phi T + \frac{\phi T}{\eta}} = \frac{1}{1 - \phi(1 - 1/\eta)} \quad (2)$$

The value of n is taken directly from the hardware where the engine is to be deployed. On the other hand, 0 is learned as it relies on many interconnected factors. While the possible designs are too many, 0 has similar values across designs that share core design elements, and so the system only needs to learn 0 for four drastically distinct design classes (LSM, LSH, B-Tree, and Hybrid: LSM-like hot levels and B-tree-like cold levels). The process is seen in Algorithm 1 shown in FIG. 1B. For each class of design r and for each operation type in q, the system benchmarks (using a Rust code template discussed below) the speedup with increasing number of queries executed in parallel and CPU cores used (one per query). This is done for all distinct VM types v for each cloud provider. The observed speedup g is fed to Equation (2) shown above to generate multiple values of $\phi(\phi_{q,r,v,D,c})$ for different VMs, numbers of total queries, and data size to derive a robust 0 for this combination of q and r. Then, for any workload W to run with a design of class r, the system calculates 0 as a weighted average of the q of each operation type in W. Then, the end-to-end latency and throughput of running W on a given VM, while maximizing utilization of n cores, are given by combining Equations 1 and 2:

$$\text{latency} = \frac{IO_{total}}{IOPS} \times \frac{1}{g}, \text{throughput} = \frac{\#\text{ operations in } W}{\text{latency}} \quad (3)$$

In Equation (3), IOPS (I/O per second) is a cloud provider-specific constant.

The value of 0 depends on the hardware. Training only for four design classes as opposed to for every possible design reduces the cost by several orders of magnitude. To reduce the cost further, the VMs of cloud providers overlap in hardware properties and thus the system only needs to train for a small subset of the total VMs (AWS alone has more than 100 VMs). For example, m5zn.large and m5n.large are AWS instances with a similar configuration (2 vCPUs, 8 GB memory, EBS-only storage, 25 Gbps network bandwidth) with the only difference being that m5n.large has a maximum EBS bandwidth of 4750 Mbps which is 3170 Mbps for m5zn.large. Such differences translate to marginal impact in the learned value of 0 at the third or fourth places of decimal, which in turn plays a negligible role in the overall cost-performance optimization. Thus, the system may utilize a list of distinct VM types and train only for those while similar VMs use these 0 values. In some embodiments, a 0 library as part of the system is provided.

Cloud providers frequently update their pricing models—the prices of VMs decline over time but the rate of decrease varies with VM types. This does not require any retraining as the system only needs to pull the new prices. Cloud providers may also add instances with new configurations based on demand. If a new VM offers distinct hardware properties than all VMs the system has trained for in the past, then the system has to train on this VM and make it part of its learned o library but this is a one-time operation. When training does need to happen, the system can also train in parallel for every distinct VM. While this saves time it does not save cloud cost.

The models described above are used to describe how the system searches for the best storage engine design given an input workload W, a desired cloud budget b, and performance requirements (latency/throughput) pr. The output is a storage engine design (expressed in the primitives of Table 2), specific VM and cloud provider choices, and the expected cloud cost and performance to run with the resulting engine and VMs.

The cloud cost and performance for each candidate storage engine depends on the hardware used. In this way, in order to find the best design and configuration for an input workload and budget b, the system first constructs the space of possible hardware (VMs) for all cloud providers S. This happens for a range of cloud cost values $C=[c_{min}, c_{max}]$ such that b falls within that range. VMs are discretely priced per time unit and so there cannot exist a hardware configuration for each $c \in C$. Thus, the system steps through C based on the pricing policy of each provider incrementally adding resources. For each cloud provider $s_i$ computing resources are combinations of VM instances of $k_i$ distinct types. Every VM $v_{i,j}$ indicating the $j^{th}$ VM instance of $s_i$, contains $v_{i,j}^{mem}$ GB of memory and $v_{i,j}^{CPU}$ vCPU cores. Storage drives are attached to each VM and determine the number of I/O operations per second, $v_{i,j}^{IOPS}$. Thus, for each $c \in C$, there are multiple deterministic possibilities of combining storage and compute resources as there is a direct mapping of hardware resources and the pricing policy of each cloud provider. The unification of all of these possibilities for each cloud cost point in C makes up the hardware space.

For each VM in the candidate hardware space, a storage engine design space is constructed. A storage engine design is mathematically represented using the data layout primitives from Table 1A as $\Omega$: (T, K, Z, $M_B$, $M_{BF}$, $M_{FP}$, $\eta$) where $\eta$ denotes the number of physical cores ($\eta \in \{1 \ldots v_{i,j}^{CPU}\}$). Given the input workload W, the distinct possibilities of allocating memory across buffers, bloom filters, and fence pointers using the pricing policy of $s_i$ for every cost in C, $\Omega_{M_B \times M_{BF} \times M_{FP}}^{W,s_i,C}$. Then, the design space over all cloud providers for cost range C is, $$\Omega^{W,S,C} = \Omega_{T \times K \times Z \times \eta}^{W} \times \cup_{s_i \in S} \Omega_{M_B \times M_{BF} \times M_{FP}}^{W,s_i,C} \quad (4)$$

For every candidate storage engine design $\Omega \in \Omega^{W,S,C}$ the system computes the expected latency for W, using the models described above. This results in the performance space P. A massive space of configurations, $\Delta_{C,\Omega,P}^{W}$ is generated. It consists of ordered triples ($\Gamma$, c, p) where $\Gamma$ denotes a configuration comprising of a storage engine design, a hardware, and a cloud provider combination that yields performance p in terms of latency and needs cloud cost c to run W. Given the number of distinct VM types $k_i$ offered by provider $s_i$, for all $c \in C$, this leads to a set, $H_{s_i}$ of VM combinations. Every combination is of the form $<\lambda_{i,1}, \lambda_{i,1} \ldots, \lambda_{i,k_i}>$, where $\lambda_{i,j}$ determines the number of instances of VM type j that can be purchased. Therefore, for a total of $m_i$ combinations under a single provider, $H_{s_i} = \{<\lambda_{i,1}, \lambda_{i,1} \ldots, \lambda_{i,k_i}>^q\}$, $1 \leq q \leq m_i$. For each VM, T, K, Z and $\eta$ possess an integral domain space, whereas the domain space of memory allocated across buffers, Bloom filters, and fence pointers is non-integral. For navigating through the memory space, the system uses "memory hopping," setting $M_B$ to a small value and then incrementing it by a fixed amount equal to $\epsilon$ fraction of the total memory M. Therefore, the cardinality of storage engine designs possible within a single $$VM \text{ is } |\Omega^{W,s_i,c}| = T \times K \times Z \times \eta \times \frac{1}{\epsilon}.$$

The cardinally of designs over $k_i$ VM types that can be purchased with a given c is $$\left(T \times K \times Z \times \frac{1}{\epsilon}\right)^{k_i}.$$

If $m_i$ distinct configurations result from different cost values in C, the cardinality of all possible configurations with provider $s_i$ is $$m_i \times \left(T \times K \times Z \times \eta \times \frac{1}{\epsilon}\right)^{k_i}.$$

For example, with $50K monthly budget only for one provider (AWS) and only with 6 distinct VMs, and even by statically assigning the highest degrees of parallelism to $\eta$, $$m_i = 74612, \, T \times K \times Z \times \frac{1}{\epsilon} = 30752(\epsilon = 0.2).$$

This leads to a total design space 74612x (30752$^6$).

Systems in accordance herewith solve two optimization problems to find the best storage engine design that minimizes cloud cost and latency l.

$$\text{argmin}(c), \text{argmin}(p) \quad (5)$$

($\Gamma$, c, p)$\in \Delta_{C,\Omega,P}$ such that $p \leq l$ ($\Gamma$, c, p)$\in \Delta_{C,\Omega,P}^{W}$ such that $c \leq b$ It is not certain that any combination of desired performance requirement pr and budget b that is given as input is possible, i.e., that there exists a storage engine design, a set of VMs and a cloud provider that can achieve performance pr with b on W. If the system were to rely on users trying again with a different input, operation would be very slow as the system would need to restart every time. Instead, the system searches simultaneously not only for the best configuration for b and pr but also for neighboring values of b and pr. This is why the cloud range is defined. By default, the system may set this range from $1-$500,000 per month, which represents diverse real-life applications, e.g., early- to mid-stage tech startups, but it is also exposed as a "knob." If the desired performance cannot be achieved, both the fastest configuration with the desired budget and the cheapest configuration with the desired performance are included in the result. Furthermore, the system enables a "what-if" design process where designers can search and explore alternative storage engine designs and budget/performance balances in an interactive way with instance system responses.

To enable all of the above and as shown in FIG. 1A, for every design search session, embodiments of the system collapse the engine design space on the cost-performance plane (given W, b). This transforms the trilateral tradeoff among engine designs, hardware and cloud cost, into a cost-performance Pareto frontier. This is effectively a continuum 1) with an optimal configuration at every point, and 2) where higher cloud cost maps to better or at least the same performance. The process of generating the continuum is shown in FIGS. 1C, 1D, and 1E (Algorithm 2). This is described below in three steps.

Step 1: Single Provider, Single Cost. The system constructs the continuum one cloud provider and one cloud cost at a time. For each configuration in $H_{s_j}$, the workload and data are sharded using off-the-shelf sharding algorithms across all VMs of the configuration proportionally to their memory capacity. For each VM type and its shard of workload, the system I/O model is used to evaluate all possible storage engine designs with all combinations of T,K,Z,η, and using memory hopping for $M_B$, $M_{BF}$ and $M_{FP}$ (Equation 1). For each possible $M_B$ value, the system splits the memory between $M_{BF}$ and $M_{FP}$ so as to have many hot levels as possible. Next, for each design D using the coefficients for operations in Wand the design class of D, the system applies the concurrency model and computes the speedup and the final end-to-end latency (Equation 3). The system ranks all designs and picks the one with the minimum end-to-end latency for this VM.

Navigating the Non-Integral Domain Space of Memory. Then the system considers additional designs around the non-integral memory space of a VM left and right of the best $M_B$ value so far (by a fixed amount equal to E fraction of the total memory M) using binary search. The system examines the expected performance of the new $M_B$ values (and derived $M_{BF}$, and $M_{FP}$) with the previously obtained values of T, K, and Z of the best design so far. Then the memory allocation with the best resulting performance is chosen. With smaller E the width of the adjacent hop regions shrinks at the cost of increasing the number of different buffer values to be checked. The system exposes E as a tuning parameter and adopts a default value of 0.1 which provides consistently a good balance among search time and quality of results.

Step 2: Optimal Design Within Each VM. In Step 2, the system repeats the above process for each distinct VM type within each configuration of each cloud provider. This allows ranking all possible configurations across all cloud providers. The input may optionally restrict the search among any subset of those providers.

Step 3: Optimized Cost-Performance Continuum. If the system locally optimizes by selecting the best configuration at every cost point, the shape of the consolidated continuum becomes zigzag without constructing a Pareto frontier. This is because each cloud provider has a different pricing policy. Optimizing locally does help to prune different configurations from the same provider but not across multiple providers. The system may partition the continuum Δ into ρ disjoint, non-overlapping partitions, $\Delta_1, \Delta_2, \ldots, \Delta_\rho$, such that, the first local optimum within any partition $\Delta_i$ is greater than that of the next partition $\Delta_{i+1}$. This implies that within every partition, there is at least one cost point that maps to a latency lower than all points of the previous partition. For a sorted order of different cost values $c_i$ mapped to latency $f(c_i)$ within the continuum, the system uses the following rule $f(c_i)=\min\{f(c_i), f(c_{i-1})\}$ to correct all the points within a partition which in turn, generates the eventual cost-performance continuum with the Pareto frontier that guarantees at least the same or better performance with increased cost. This leads to a decreasing curve.

In some embodiments, the system takes as an optional input cloud SLA requirements. SLAs are provisioning and monitoring services that guarantee a threshold level of cloud service quality. In some embodiments, the system supports five SLA features: (i) DB migration, (ii) operational and tooling support, (iii) backup, (iv) reliability, and (v) availability. SLAs are mathematically quantified and exposed as computable pricing models. If any SLA is required, then every cloud cost c E C is co-optimized for purchasing of hardware and SLAs. Using Algorithm 2, the system ensures that (a) the combined price of hardware and SLAs never exceeds c and (b) all resource-SLA permutations are considered. For a given cloud cost, and based on the size of data, the system determines how many t2.micro VMs can be maximally purchased with DB migration SLA.

The actual workload may vary from the input workload. To ensure that configurations are robust, the system adds noise in W by adding a proportion of operations that are absent in Wand also varying the proportion of existing ones. This can be tuned manually, but may also be set by default (e.g., to 10% noise), which has been found to provide consistent results across numerous diverse workloads.

Once the continuum is constructed, the system can instantly navigate it using a binary-search to generate as output the optimal configuration $\Gamma_{optimal}$ (storage engine design, VMs, and provider) for the available cloud budget. This is shown in FIG. 1A. In addition, now that the continuum exists, the system can also suggest neighboring configurations with attractive budget-performance balances. Finally, this continuum enables the "what-if" capability because designers can interactively query the system to get the optimal configuration for any budget or performance point (given W).

Once the search process terminates, the system may use the description of the resulting design to set up the code for the target storage engine. In various embodiments, the system includes a templated key-value engine including or consisting of Rust library crates for one or more components of the storage engine template in Tables 1A and 1B. Each crate containerizes the structure and capacity of a storage component and also offers its own set of Rust Traits that define how it can be created or accessed for reads and writes, garbage collection, capacity checks, and inter-crate interactions. The system may also maintain a wrapper crate for the entire storage engine the traits of which directly link to that of the buffer and the main tree. By using the values of the layout primitives in the target design, the system initializes the code template.

In addition to the layout primitives, the system's engine template (e.g., code template(s) 212 described below in connection with FIG. 2) may contain a set of algorithmic abstractions. Each algorithmic abstraction not only indicates a core functionality of the storage engine but also controls the granularity at which the functionality is induced within the engine. Tables 1A and 1B show such primitives and their definitions. For example, <restructuring strategy> denotes how data is restructured (B-trees), merged (LSH-tables), or compacted (LSM-trees) across diverse designs. Based on the resulting engine design from the search process, the system may determine which algorithmic primitives are the best fit. For instance, the absence of Bloom filters ($M_{BF}$=0) means that the design is not in the LSM class. If the class is LSM, merging starts from the first run of a level and so the system sets run_strategy=full, whereas in B-trees, run and level are synonymous as merges happen at the granularity of files (run_strategy=none, file_picking_strategy=choose_first). Similarly, for concurrency, the system may use the learned coefficient (4)) of the workload on the chosen design class to set the degrees of parallelism to the point where Equation 2 converges or speedup does not improve by adding more cores. Algorithm 3 shown in FIG. 1F indicates the primary rules to setup the template given a data layout.

Representative Architecture

Approaches for achieving an optimal balance between the costs of updates and lookups for a particular workload and hardware in accordance herewith can be implemented in any suitable combination of hardware, software, firmware, or hardwiring. FIG. 2 illustrates an exemplary embodiment utilizing a suitably programmed general-purpose computer 200 (sometimes called a storage system). The computer includes a central processing unit (CPU) 220, at least a main (volatile) memory 202 having a file buffer and multiple Bloom filters, each associated with a memory access run, and non-volatile mass storage devices 222 (such as, e.g., one or more hard disks and/or optical storage units) for storing various types of files. The computer 200 further includes a bidirectional system bus 224 over which the CPU 220, main memory 202, and storage devices 222 communicate with each other and with internal or external input/output devices, such as traditional user interface components 226 (including, e.g., a screen, a keyboard, and a mouse) as well as with a remote computer 228 and/or a remote storage device 232 via one or more networks 230. The remote computer 228 and/or storage device 232 may transmit any information (e.g., keys and/or values associated with various applications) to the computer 200 using the network 230.

In some embodiments, the remote computer 228 performs key-value storage engine optimization as described above and transmits one or more parameters of an optimized key-value storage engine for implementation on the system 200. Alternatively, the system 200 itself may perform the key-value storage engine optimization as shown in FIG. 2, with the optimization components executed locally, and the system 200 may use the remote computer 228 and/or the remote storage device 232 to offload tasks and/or workloads in a conventional manner and/or in accordance with the optimized key-value storage engine design following its implementation. The network 230 may be one or more a cloud networks providing cloud-based computing and memory resources as part of the key-value storage engine.

For convenience, the ensuing discussion assumes local implementation of the key-value storage engine as well as the optimization components on the system 200. These components include a database management system (DBMS) 204, which itself manages reads and writes to and from various tiers of storage, including the main memory 202 and secondary storage devices 222. The DBMS 204 establishes, and can vary, operating parameters including the size ratio, T, among levels, the bound on a number of runs, Z, at the largest level L, the bound on a number of runs, K, at each of the smaller levels 1 to L−1, the merge policy, the FPR assigned to Bloom filters across different levels, allocation of main memory between the buffer and the filters, or any of the parameters shown in Tables 1A and 1B described above. The DBMS 204 may be implemented by computer-executable instructions (conceptually illustrated as a group of modules and stored in the main memory 202) that are executed by the computer 200 so as to control the operation of CPU 220 and its interaction with the other hardware components.

In the illustrated embodiment, the DBMS 204 includes a workload execution engine 216 for performing (or executing) a workload (or parts thereof) including memory-access runs, each run specifying one or more files to be written from the file buffer to the secondary store and one or more files to be retrieved from the secondary store to the file buffer.

The DBMS 204 includes a key-value storage engine optimization module 206 that itself stores, in nonvolatile memory, at least one data structure design (e.g., data structure designs 208). A key-value storage engine includes memory and computational hardware that may be separate and distinct from the processor (e.g., the CPU 220) used to perform workload execution. For example, the remote computer 228 and the remote storage device 232 may be used as the key-value storage engine. Although the key-value storage engine optimization is performed locally on the system 200 in accordance with FIG. 2, the optimized storage engine may be executed using resources provided by a cloud provider (e.g., on the remote computer 228 and the remote storage device 232). If optimization and design are performed remotely (e.g., on the remote computer 228), the entity performing optimization may provision the key-value storage engine on the system 200 or transmit the design for manual implementation thereon.

In some embodiments, the configuration is optimized by the key-value storage engine optimization module 206, based at least in part on (i) an analytical distribution-aware input-output (I/O) model of data movement across a design space of possible key-value memory configurations and (ii) a cost model that estimates a cost of executing an input workload for a cloud-based memory resource budget and a target latency and throughput. The cost models are computed as described above and stored in nonvolatile memory (illustrated as cost model(s) 210) for later retrieval and use. The data structure designs 208 may comprise designs for read-heavy workloads, write-heavy workloads, designs for systems with large memory, and combinations thereof. For example, the data structure designs 208 may comprise one or more of log-structured merge-trees, B-trees, log-structured hash tables, or combinations thereof. In general, the computational hardware for a key-value storage engine comprises nonvolatile storage (e.g., the memory 202, the remote storage device 232) and may implement at least one virtual machine (e.g., a VM instance provided by a cloud provider). In some embodiments, the key-value storage engine includes at least one in-memory accelerator (e.g., in-memory accelerator 234) that may include accelerators for buffer, filters, and/or indexes. In some embodiments, the in-memory accelerator(s) are auxiliary data structures in a storage engine in addition to the base data structure (e.g., log-structured merge-trees, B-trees, log-structured hash tables, or combinations thereof) used for on-disk storage. The in-memory accelerators enable fast disk data access.

The cost model 210 typically includes cloud pricing policies for a plurality of cloud providers. The processor (e.g., the CPU 220, the remote computer 228, or the combination) may use a code template 212 that allows structured descriptions of data layout and algorithmic abstractions of the storage engine. Examples of templates are described above in connection with Tables 1A and 1B. The code template may include layout primitives for design and hardware specifications for key-value storage engines based on core data structures thereof. The processor chooses among construction policies of filters based on the layout primitives (e.g., for reducing the FPR, optimizing the number of internal hash functions, or controlling the granularity of filters per block, file, or run) as described above.

The layout primitives may include one or more of (i) a size of keys in a workload, (ii) a size of values in the workload (values accepted as variable-length strings), (iii) a maximum number of entries in a memory block (e.g., growth factor in LSM trees or fanout of B-trees); (iv) a number of runs per hot level at which hot levels of the key-value storage engine are compacted (should be less than size ratio); (v) a number of runs per cold level at which cold levels of the key-value storage engine are compacted (should be less than size ratio); (vi) a logical block size corresponding to a number of consecutive disk blocks; (vii) buffer capacity corresponding to an amount of memory allocated to in-memory buffer or memory tables (configurable with respect to file size); (viii) an amount of memory allocated to memory indexes (fence pointers or hash tables); or (ix) bits per entry assigned to one or more Bloom filters, examples of which are described above in connection with Table 1A.

In some embodiments, the code template includes criteria for parallelism and data access including one or more of (i) the granularity of Bloom filters of the key-value storage engine 206 (e.g., one Bloom filter instance per block or per file or per run); (ii) the compaction or restructuring algorithm (full indicates level-to-level compaction, partial indicates file-to-file compaction, and hybrid indicates use of both full and partial at separate levels); (iii) a run strategy for partial or hybrid compaction (for LSM-tree, the default may be set to dense_fp); (iv) a merge threshold at which a compaction is triggered; (v) a value denoting how many memory levels will have full compaction; (vi) the number of CPUs or available cores for use in a virtual machine; or (vii) the maximum number of threads used to process a workload. Examples are described above in reference to Table 1B.

As described above, the cost model 210 may comprise (i) an analytical distribution-aware I/O model that captures data movement across a plurality of candidate key-value storage engines, and (ii) a learned concurrency model accounting for processor resources, query concurrency, and hardware parallelism. The processor may be further configured to characterize a workload as a set of operations over a universe of key-value pairs, using (i) a distribution of keys and operations in the workload, and (ii) a proportion of each operation type in the workload (e.g., single-result lookups, no-result lookups, range queries, inserts, blind updates, and read-modify writes). The processor may be further configured to use a plurality of distributions over which keys are drawn for reads and writes. The plurality of distributions may comprise (i) a uniform distribution in which any key is equally likely to be drawn, or (ii) a non-uniform distribution. The learned concurrency model learns a proportion of a program that is parallelizable by benchmarking each operation type in the input workload based on shared core design elements. The benchmarking may include measuring a speedup obtained by increasing a number of queries executed in parallel. Where the key-value storage engine includes a plurality of types of virtual memory, benchmarking is performed for each type of virtual memory and for each cloud-based memory resource.

The processor is further configured to transform tradeoff among storage engine designs, hardware and cloud cost into a cost-performance Pareto frontier which, as described above, is a continuum (i) with an optimal configuration at every point and (ii) where higher cloud cost maps to better or at least the same performance. FIG. 1A described above provides details of these operations. The processor may construct the continuum one cloud provider and one cloud cost at a time; and repeat the construction of the continuum for each distinct VM type within each configuration of each cloud provider, thereby ranking all possible configurations across all cloud providers.

In some embodiments, the configuration is optimized based further on cloud SLA requirements (e.g., cloud Service Level Agreements 214). The cloud SLA requirements may include database migration, operational and tooling support, back-up, reliability, and/or availability. The configuration may be optimized based further on quantifying each SLA requirement and for any SLA required for the input workload, co-optimizing cloud cost for purchase of hardware and SLAs, thereby ensuring that the combined price of hardware and SLAs does not exceed a predetermined cloud budget.

In some embodiments, at least part of the key-value engine is deployed on a cloud-based memory resource. For example, after the key-value storage engine optimization module 206 determines an optimized key-value storage engine for an input workload, the input workload may be executed using the optimized key-value storage engine deployed on a VM instance from a cloud provider.

The system 200 includes an operating system 218 that directs the execution of low-level, basic system functions such as memory allocation, file management and operation of the main memory 202 and/or mass storage devices 222. At a higher level, the computational functionality required for optimizing the key-value storage engine may be implemented as one or more service applications. For example, as illustrated, upon receiving a query from a user via the user interface 226 and/or from an application in the remote computer 228, the system may access the main memory 202 and/or the secondary storage devices 222 to look up a target key. Upon finding the target key, the system may access the data that is identified by the target key; the data may be stored in a database (not shown) associated with the main memory 202, secondary storage devices 222, remote computer 228 and/or remote storage device 232. To speed up the lookup process uses the optimized key-value storage engines described above, in various embodiments.

Generally, program modules 206-216 include routines, programs, objects, components, data structures, etc. that performs particular tasks or implement particular abstract data types. Those skilled in the art will appreciate that the invention may be practiced with various computer system configurations, including multiprocessor systems, microprocessor-based or programmable consumer electronics, mini-computers, mainframe computers, and the like. The invention may also be practiced in distributed computing environments where tasks are performed by remote processing devices that are linked through a communications network. In a distributed computing environment, program modules may be located in both local and remote computer-storage media including memory storage devices.

In addition, the CPU 220 may comprise or consist of a general-purpose computing device in the form of a computer including a processing unit, a system memory, and a system bus that couples various system components including the system memory to the processing unit. Computers typically include a variety of computer-readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

The CPU 220 that executes commands and instructions may be a general-purpose processor, but may utilize any of a wide variety of other technologies including special-purpose hardware, a microcomputer, mini-computer, mainframe computer, programmed micro-processor, micro-controller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), smart chip, or any other device or arrangement of devices that is capable of implementing the steps of the processes of the invention.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Figure 2:
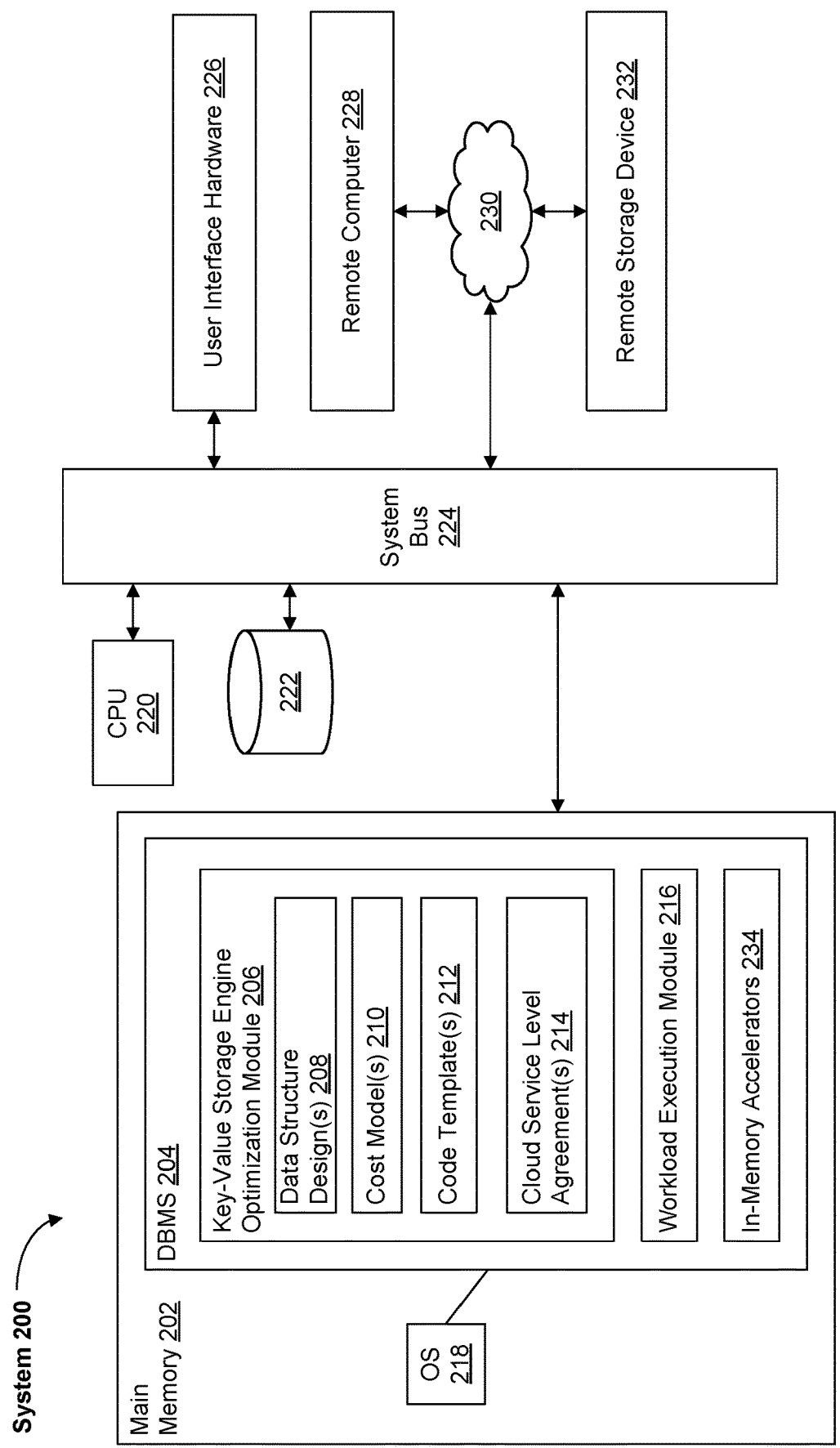
FIG. 2 is a block diagram illustrating a facility for an optimized self-designing key-value storage engine in accordance with various embodiments.

More generally, the computer shown in FIG. 2 is representative only and intended to provide one possible topology. It is possible to distribute the functionality illustrated in FIG. 2 among more or fewer computational entities as desired. The network 230 may include a wired or wireless local-area network (LAN), wide-area network (WAN), a cloud network (e.g., public cloud systems, such as AWS, GCS, Azure, private cloud systems, or hybrid cloud systems), and/or other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI, for example. For wireless communications, communications protocols may include the cellular telecommunications infrastructure, WiFi or other 802.11 protocol, Bluetooth, Zigbee, IrDa or other suitable protocol. Furthermore, components of the system may communicate through a combination of wired or wireless paths.

Any suitable programming language may be used to implement without undue experimentation the analytical functions described within. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages may be utilized as is necessary or desirable.

Figure 3:
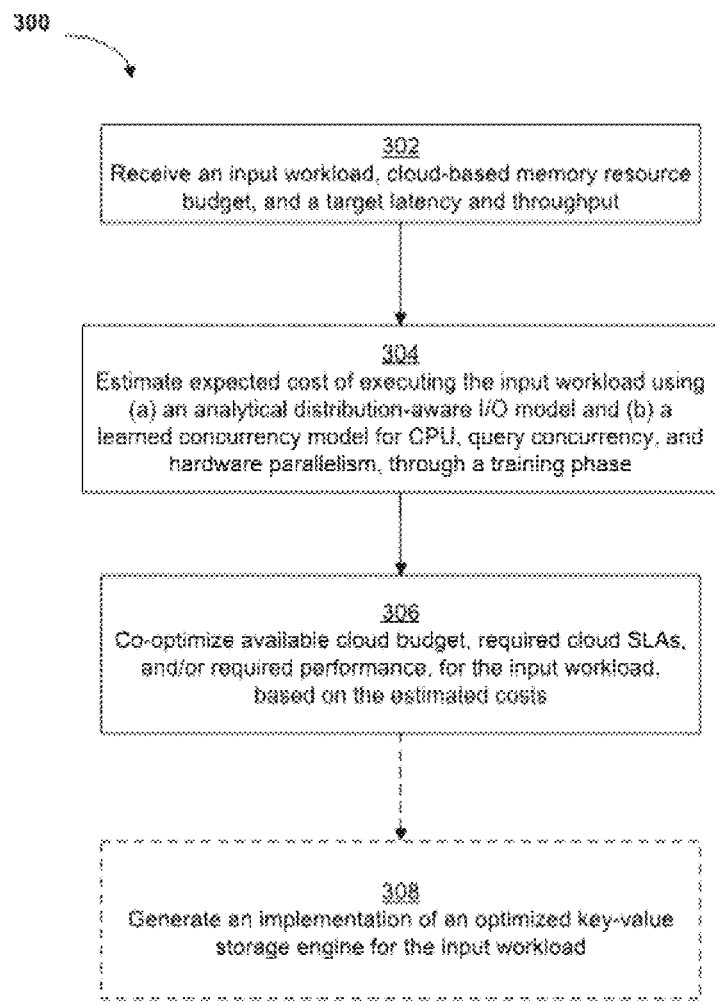
FIG. 3 is a flow chart of an example method for optimizing a key-value storage engine, according to some embodiments.

FIG. 3 shows a flow chart of an example method 300 for optimizing a key-value storage engine, according to some embodiments. The method may be executed on a computer (e.g., the computer 200). The method 300 includes receiving (step 302) an input workload, cloud-based memory resource budget, and a target latency and throughput. Example input workloads are described in the Background section and may include data and query for one or more applications. In some embodiments, this step includes receiving cloud SLA requirements; these may include database migration, operational and tooling support, back-up, reliability and/or availability.

The method also includes estimating (step 304) the expected cost of executing the input workload using (a) an analytical distribution-aware I/O model and (b) a learned concurrency model for CPU, query concurrency, and hardware parallelism, through a training phase. This step may use one or more templates to represent the input workload, and using one or more cost models for modelling execution of the input workload, details of which are described above. The templates are representative of data structure designs. In some embodiments, the data structure designs include designs for read-heavy workloads, write-heavy workloads, designs for systems with large memory, or combinations thereof. In some embodiments, the data structure designs comprise one or more of log-structured merge-trees, B-trees, log-structured hash tables, or combinations thereof. The cost model may include cloud pricing policies for a plurality of cloud providers. In some embodiments, the code template (sometimes called the template) includes layout primitives for design and hardware specifications for key-value storage engines based on core data structures thereof. The method 300 includes choosing among construction policies of filters based on the layout primitives. In some embodiments, the layout primitives include one or more of (i) the size of keys in a workload, (ii) the size of values in the workload, (iii) the maximum number of entries in a memory block; (iv) the number of runs per hot level at which hot levels of the key-value storage engine are compacted; (v) the number of runs per cold level at which cold levels of the key-value storage engine are compacted; (vi) a logical block size corresponding to a number of consecutive disk blocks; (vii) buffer capacity corresponding to an amount of memory allocated to in-memory buffer or memory tables; (viii) the amount of memory allocated to memory indexes; or (ix) bits per entry assigned to one or more Bloom filters.

In some embodiments, the code template includes criteria for parallelism and data access including one or more of (i) a granularity of Bloom filters of the key-value storage engine; (ii) compaction or restructuring algorithm; (iii) a run strategy for partial or hybrid compaction; (iv) a merge threshold at which a compaction is triggered; (v) a value denoting how many memory levels will have full compaction; (vi) the number of CPUs or available cores for use in a virtual machine; and/or (vii) the maximum number of threads used to process a workload. In some embodiments, the estimating step 304 includes characterizing a workload as a set of operations over a universe of key-value pairs, using (i) a distribution of keys and operations in the workload, and (ii) a proportion of each operation type in the workload.

In some embodiments, the method 300 uses a plurality of distributions over which keys are drawn for reads and writes. The plurality of distributions may include (i) a uniform distribution in which any key is equally likely to be drawn, or (ii) a non-uniform distribution. The learned concurrency model may learn the proportion of a program that is parallelizable by benchmarking each operation type in the input workload based on shared core design elements. In some embodiments, the benchmarking includes measuring a speedup obtained by increasing a number of queries executed in parallel. The key-value storage engine may include a plurality of types of virtual memory and the benchmarking may be performed for each type of virtual memory and for each cloud-based memory resource. In some embodiments, the step 304 includes quantifying each SLA requirement and for any SLA required for the input workload.

The method also includes co-optimizing (step 306) available cloud budget, required cloud SLAs, and and/or required performance, for the input workload, based on the estimated costs. In some embodiments, this step includes transforming a tradeoff among storage engine designs, hardware and cloud cost, into a cost-performance Pareto frontier which is a continuum (i) with an optimal configuration at every point and (ii) where higher cloud cost maps to better or at least the same performance. The method 300 may include constructing the continuum one cloud provider and one cloud cost at a time, and repeating the construction of the continuum for each distinct VM type within each configuration of each cloud provider, thereby ranking all possible configurations across all cloud providers. In some implementations, the step 306 includes co-optimizing cloud cost for purchase of hardware and SLAs, thereby ensuring that the combined price of hardware and SLAs does not exceed a predetermined cloud budget.

In some embodiments, the method 300 also includes actually generating (308) an implementation of an optimized key-value storage engine for the input workload. An example RUST code template for performing this step is described above.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A storage system comprising:
a main memory comprising volatile storage and including a file buffer;
a secondary store comprising nonvolatile storage for storing files;
a key-value storage engine including indexes to files stored in the file buffer and the secondary store, the key-value storage engine being organized into levels and indexing the files as key-value pairs; and
a processor for performing a workload including memory-access runs, each run specifying one or more files to be written from the file buffer to the secondary store and one or more files to be retrieved from the secondary store to the file buffer,
wherein:
the key-value storage engine has a configuration including at least one data structure design and computational hardware; and
the configuration is optimized based at least in part on a cost model that comprises (i) an analytical distribution-aware input-output (I/O) model of data movement across a design space of possible key-value memory configurations and (ii) a learned concurrency model that accounts for processor resources, query concurrency, and hardware parallelism, and estimates a cost of executing an input workload for a cloud-based memory resource budget and a target latency and throughput.

2. The system of claim 1, wherein the configuration is optimized by the processor.

3. The system of claim 2, wherein the processor is further configured to use a code template that allows structured descriptions of data layout and algorithmic abstractions of the storage engine.

4. The system of claim 2, wherein the at least one data structure design comprises one or more of log-structured merge-trees, B-trees, log-structured hash tables, or combinations thereof.

5. The system of claim 3, wherein the code template includes criteria for parallelism and data access including one or more of (i) a granularity of Bloom filters of the key-value storage engine; (ii) a compaction or restructuring algorithm; (iii) a run strategy for partial or hybrid compaction; (iv) a merge threshold at which a compaction is triggered; (v) a value denoting how many memory levels will have full compaction; (vi) a number of CPUs or available cores for use in a virtual machine; or (vii) a maximum number of threads used to process a workload.

6. The system of claim 3, wherein the code template includes layout primitives for design and hardware specifications for key-value storage engines based on core data structures thereof.

7. The system of claim 6, wherein the processor is further configured to choose among construction policies of filters based on the layout primitives.

8. The system of claim 6, wherein the layout primitives include one or more of (i) a size of keys in a workload, (ii) a size of values in the workload, (iii) a maximum number of entries in a memory block; (iv) a number of runs per hot level at which hot levels of the key-value storage engine are compacted; (v) a number of runs per cold level at which cold levels of the key-value storage engine are compacted; (vi) a logical block size corresponding to a number of consecutive disk blocks; (vii) buffer capacity corresponding to an amount of memory allocated to in-memory buffer or memory tables; (viii) an amount of memory allocated to memory indexes; or (ix) bits per entry assigned to one or more Bloom filters.

9. The system of claim 1, wherein the at least one data structure design comprises designs for read-heavy workloads, write-heavy workloads, designs for systems with large memory, and combinations thereof.

10. The system of claim 1, wherein the computational hardware comprises nonvolatile storage and at least one virtual machine.

11. The system of claim 1, wherein the at least one data structure design comprises at least one in-memory accelerator.

12. The system of claim 11, wherein the at least one in-memory accelerator comprises accelerators for buffer, filters, and indexes.

13. The system of claim 1, wherein the cost model includes cloud pricing policies for a plurality of cloud providers.

14. The system of claim 1, wherein the processor is further configured to characterize a workload as a set of operations over a universe of key-value pairs, using (i) a distribution of keys and operations in the workload, and (ii) a proportion of each operation type in the workload.

15. The system of claim 14, wherein the processor is further configured to use a plurality of distributions over which keys are drawn for reads and writes.

16. The system of claim 15, wherein the plurality of distributions comprises (i) a uniform distribution in which any key is equally likely to be drawn, or (ii) a non-uniform distribution.

17. The system of claim 1, wherein the learned concurrency model learns a proportion of a program that is parallelizable by benchmarking each operation type in the input workload based on shared core design elements.

18. The system of claim 17, wherein the benchmarking includes measuring a speedup obtained by increasing a number of queries executed in parallel.

19. The system of claim 18, wherein the key-value storage engine includes a plurality of types of virtual memory and the benchmarking is performed for each type of virtual memory and for each cloud-based memory resource.

20. The system of claim 1, wherein the processor is further configured to:
transform tradeoff among storage engine designs, hardware and cloud cost, into a cost-performance Pareto frontier which is a continuum (i) with an optimal configuration at every point and (ii) where higher cloud cost maps to better or at least the same performance.

21. The system of claim 20, wherein the processor is further configured to:
construct the continuum one cloud provider and one cloud cost at a time; and
repeat the construction of the continuum for each distinct VM type within each configuration of each cloud provider, thereby ranking all possible configurations across all cloud providers.

22. The system of claim 1, wherein the configuration is optimized based further on cloud service level agreement (SLA) requirements.

23. The system of claim 22, wherein the cloud SLA requirements include at least one of database migration, operational and tooling support, back-up, reliability, or availability.

24. The system of claim 23, wherein the configuration is optimized based further on quantifying each SLA requirement and for any SLA required for the input workload, co-optimizing cloud cost for purchase of hardware and SLAs, thereby ensuring that the combined price of hardware and SLAs does not exceed a predetermined cloud budget.

25. The system of claim 1, wherein at least part of the key-value engine is deployed on a cloud-based memory resource.

* * * * *